United States Patent
Shen

(10) Patent No.: US 7,102,476 B1
(45) Date of Patent: Sep. 5, 2006

(54) METHOD TO ESTIMATE ATTRACTIVE FORCE IN A PERMANENT MAGNET CHUCK

(75) Inventor: Chi-Hung Shen, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 11/378,911

(22) Filed: Mar. 17, 2006

Related U.S. Application Data

(63) Continuation-in-part of application No. 11/106,333, filed on Apr. 14, 2005.

(51) Int. Cl.
*H01F 7/20* (2006.01)
(52) U.S. Cl. .................... 335/285; 335/295; 269/8
(58) Field of Classification Search ........ 335/285–295; 269/8; 294/65.5
See application file for complete search history.

(56) References Cited

U.S. PATENT DOCUMENTS

| 4,250,478 A |   | 2/1981  | Cardone et al. |
|---|---|---|---|
| 4,314,219 A |   | 2/1982  | Haraguchi |
| 4,625,928 A | * | 12/1986 | Peekna ................ 242/430 |
| 4,676,161 A | * | 6/1987  | Peekna ................ 101/378 |
| 4,684,112 A | * | 8/1987  | Chernikov et al. ........ 269/8 |
| 5,435,613 A |   | 7/1995  | Jung |
| 6,076,873 A |   | 6/2000  | Jung |
| 6,489,871 B1 | * | 12/2002 | Barton ................ 335/285 |

* cited by examiner

*Primary Examiner*—Ramon M. Barrera
(74) *Attorney, Agent, or Firm*—Kathryn A. Marra

(57) ABSTRACT

The design of permanent magnet chucks of desired specified attractive force at the base or working face of the chuck is expedited by the discovery of a general correlation between two specific engineering parameters. The attractive force intensity expressed as force per unit chuck working face contact area correlates with the ratio of area of the iron block surfaces at the working face to the area of the permanent magnet surfaces contacting the iron blocks and providing the magnetic flux path to them.

6 Claims, 2 Drawing Sheets

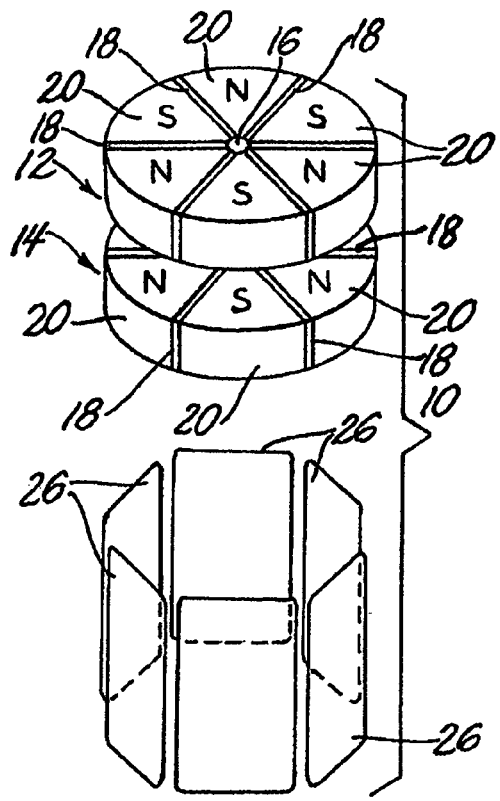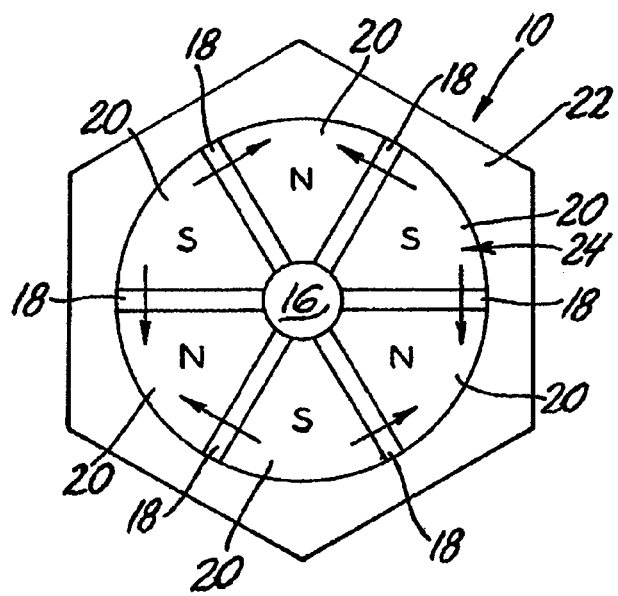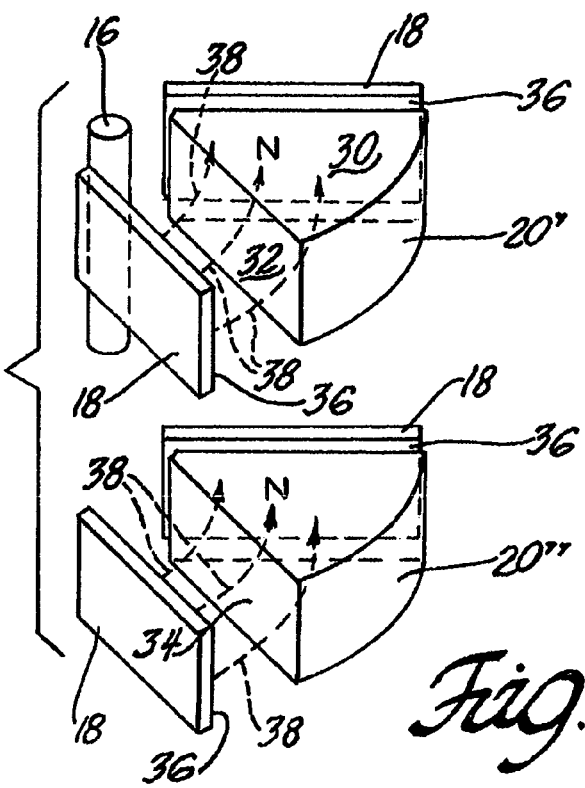

METHOD TO ESTIMATE ATTRACTIVE FORCE IN A PERMANENT MAGNET CHUCK

This is a continuation-in-part of co-pending application Ser. No. 11/106,333, filed Apr. 14, 2005, entitled "Modular Permanent Magnet Chuck" and assigned to the assignee of this invention.

TECHNICAL FIELD

This invention pertains to the design of permanent magnet chucks of the type having permanent magnet plates interposed with magnetically soft ferrous blocks. Magnetic chucks are designed with a base or working face for attracting workpieces with a specified magnetic force. This invention provides a fast and accurate method for estimating the attractive force obtainable by a design for a chuck before constructing the chuck.

BACKGROUND OF THE INVENTION

Strong permanent magnets are useful in manufacturing operations requiring reconfigurable holding and transporting devices for workpieces. For example, manufacturing facilities for high volume vehicle engine production require many pallets for moving engine components and assemblies between machining stations. Magnetic chucks can be used to reconfigure the pallets for different engines. Of course, chucks are also used for holding workpieces in a fixed position during machining. Compact permanent magnet chucks that can be conveniently turned on and off provide a means of providing reconfigurable fixtures for making different engines or other workpieces on the same manufacturing line.

The text and drawings of the specification of the parent application describe a very compact, efficient, and useful arrangement of permanent magnet plates and magnetically soft bodies for a magnetic chuck. The magnetic chuck has two substantially identical layers of an even number of alternating permanent magnet plates and interposed soft magnet bodies. The top surfaces of the two layers are sufficiently alike in the plan views of the permanent and soft magnet elements that one layer can be rotated through a small angle (usually no more than 90°, depending on the number of magnets) from an magnetically inactive position with like overlying shapes to an active position with like overlying shapes. In the active position of the chuck the magnetic field extends above the working face of the chuck and a strong attracting force is exerted on a ferromagnetic workpiece(s) to secure it against the chuck base or working surface.

A specific chuck or group of chucks must be designed to have a working face of specified shape and area and to exert a specified attractive force on a workpiece. It has been difficult to estimate the attractive force obtainable from a new design without building the chuck.

A commercial computer simulation software package for three-dimensional magnetostatics design is available. This software contains a CAD three-dimensional modeler, a material database, a Solver for computational algorithms of the magnetostatics field, and a graphical display capable of presenting the computational results in various parametric forms and solid modeling views. The primary goal of using such magnetostatics software is to shorten the time in the development and validation of any new magnetic chuck concept by not having to actually to build the unit. Still, it is found that the total time required in modeling the various sub-components and their engineering features in a proposed chuck design and in running the Solver to compute the expected magnetic attractive force takes one to three days. This invention provides a method for accurately estimating the strength of the magnetic attraction force given the magnetic properties of the permanent magnet plates and the soft magnet blocks, the clutch face area of the soft magnet blocks, and the contacting area of the sides of the interposed permanent magnet bodies that induce the magnetic field in the enclosing soft magnets.

SUMMARY OF THE INVENTION

In many magnetic chuck designs, including the designs disclosed in the parent of this application, one or more permanent magnet bodies are positioned to direct magnetic flux into a one or more magnetically soft bodies (of, for example, steel or iron). Combinations of permanent magnet bodies and soft magnet bodies are arranged to form a closed magnetic flux loop and to obtain a specified holding force. The soft magnet bodies confine, concentrate, and direct the magnetic flux lines produced by the permanent magnet bodies. In the activated position of these magnet chuck elements, a strong magnetic flux field extends from a working surface of the soft magnet material, enters the workpiece(s), and returns through a suitable flux return path to the permanent magnet source(s). The loop of magnetic flux exerts an attractive force on the workpiece(s) holding it against the face of the chuck The permanent magnets may, for example, be suitably shaped blocks or plates of magnetized iron-neodymium-boron composition. The soft magnet bodies are typically formed of ferromagnetic ferrous compositions such as soft irons, or alloys of iron-silicon, nickel-iron, and soft ferrites.

An examination of many such magnet chucks has revealed to this inventor that the force due to magnetic attraction at a working face area of a soft magnet block is related to the total surface area of permanent magnet bodies introducing magnetic flux into the soft magnet body. A plot of magnetic force intensity in newtons per square millimeter ($N/mm^2$) of working face area versus the dimensionless ratio of cross sections of iron and Fe—Nd—B permanent magnets is like that of FIG. 5 of this specification. A typical 4-parameter algebraic expression for the FIG. 5 curve is:

$$F = \frac{a + bx}{1 + cx + dx^2}$$

where F is force per unit area, x is the ratio of cross sections of iron and permanent magnets, a=4.57, b=−1.45, c=4.37, and d=−0.19.

This relationship of force intensity and magnet areas is used as follows. Once the general arrangement of the iron and permanent magnets and their rough dimensions have been described, the cross sections of the iron and the permanent magnets can be quickly established. Using FIG. 5 of this specification or the above mathmatical expression, the force intensity is determined in, for example, $N/mm^2$. The total attractive force created by the magnetic chuck is obtained by multiplying the force intensity by the chuck base area. The whole calculation takes only a few minutes and the proposed chuck design can be decided as favorable to move into the detailed design phase if the force magnitude is deemed large enough. Otherwise, design changes in either the geometric configuration or the iron/magnet dimensions can be made and another force estimate is performed with the invention methodology. Hence, the design iterations can be accomplished in a very short time period as opposed to weeks and months using just the computer modeling and simulation software.

The data summarized in graphical form in FIG. 5 was obtained from an analysis of a number of different magnet chucks in which the permanent magnets were iron-neodymium-boron magnets of about the same magnetic properties and the magnetically soft materials were low carbon steel blocks. The shapes and arrangements of the permanent and soft magnet bodies differed substantially. But a correlation like that formulated in FIG. 5, and converted by regression analysis to the above equation or the like, can be used as described in this specification in determining the magnetic force of a chuck of a different arrangement of permanent and soft magnet bodies when the respective bodies have the same magnetic properties.

Other objects and advantages of the invention will become apparent from a detailed description of preferred embodiments which follows.

BRIEF DESCRIPTION OF THE DRAWINGS

FIG. 1 is an oblique view of two round chuck layers (disks) for illustrating an embodiment of this invention. Each chuck layer includes six radially positioned permanent magnet plates separated by six arcuately shaped (pie shaped) soft magnet blocks with alternating north-south magnetic poles. In FIG. 1 the two chuck layers are positioned so that the chuck is in a magnetically active state for holding ferromagnetic workpieces against a working surface of the chuck.

FIG. 2 is an exploded view of isolated elements of the FIG. 1 hexagonal chuck arrangement illustrating how magnetic flux emanating from the magnetically north pole (N) sides of four permanent magnet plates enters two pie shaped magnetically soft steel blocks and is directed to and concentrated at the upper surface of the upper steel block at the working surface of the chuck.

FIG. 3 is a plan view of the round magnet chuck layer assembly of FIG. 1 in a hexagonal non-magnetic frame, the combination adapted for compact rotation of the layer in an assembled two layer chuck between magnetically active and magnetically inactive positions.

DESCRIPTION OF PREFERRED EMBODIMENTS

A practice of the invention will be illustrated with respect to magnetic chuck designs described in the above identified parent application of this case. The text and drawings of the parent application are incorporated by reference into this specification for their disclosures of their magnetic chuck constructions. However, the invention may be practiced with other permanent magnet chuck designs using a combination of permanent magnet bodies and magnetically soft bodies.

Figure 5:
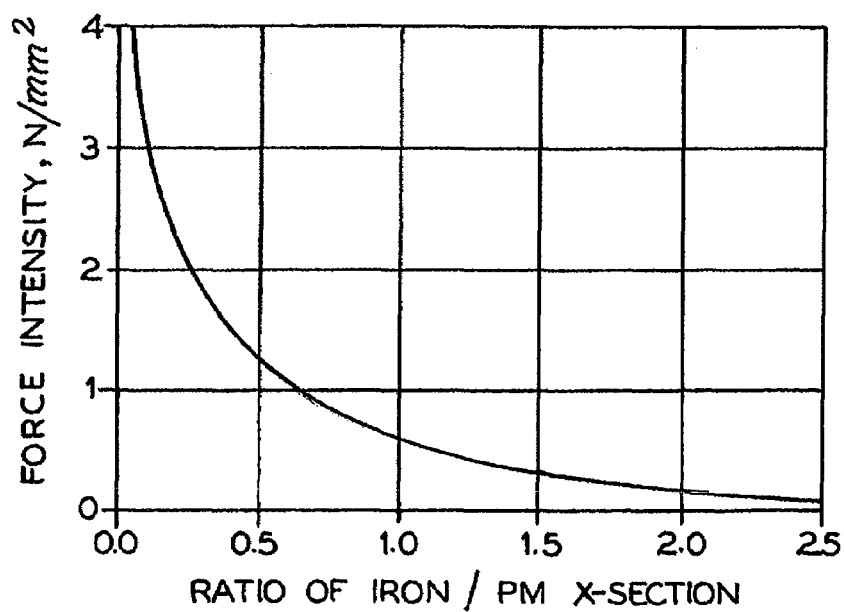
FIG. 5 is a graph of magnetic force intensity in newtons per square millimeter (N/mm$^2$) of magnet chuck face area versus the ratio of iron cross-sectional area to permanent magnet cross-sectional area.

Further, the practice of the invention uses data obtained by taking apart existing magnet chucks containing permanent magnet parts (in this case Fe—Nd—B magnets) and magnetically soft iron (steel) parts. The sizes, shapes, and arrangements of the magnetically soft and hard magnets in the various chucks differed. However, it was observed that a relationship existed between the areas of specific surfaces of the permanent magnets and the iron magnets that could be used to significantly shorten the time required in estimating the attractive force to be realized in a magnet chuck design that has not yet been constructed. Exemplary data is summarized in the curve of FIG. 5 and in an algebraic expression that will be used in the practice of this invention.

A preferred permanent magnet chuck employs two identical sets of permanent magnets; one set is positioned directly on top of the other set. The permanent magnets can be made from any magnetically hard ferromagnetic materials but the rare earth-containing neodymium-iron-boron (Nd—Fe—B) material is the preferred choice because of its high magnetic property values. For example, commercially available Nd—Fe—B peermanent magnets display values of residual induction (Br) in the range of 13,800 to 14,700 Gauss, values of coercivity (iHc) in the range of 11,000 to 14,000 Oersteds, and values of coercivity (bHc) in the range of 10,300 to 13,100.

Inserted between the permanent magnet bodies are magnetically soft iron blocks or other soft magnetic materials. Brass or other non-magnetic materials are used as spacer and container materials in the chuck design to permit the formation of a closed loop of magnetic flux for the function of the chuck.

FIG. 1 shows permanent magnet chuck 10 formed of two round disc-like layers 12, 14. Magnet chuck layers 12, 14 each have flat upper and lower surfaces and are preferably of the same size, shape and construction. Each of magnet chuck layers 12 and 14 includes a non-magnetic brass center rod 16, six generally rectangular permanent magnet plates 18 disposed vertically and radially at sixty degree angles of arc from brass center rod 16, and six pie-shaped magnetically soft iron or steel blocks 20. The opposing major rectangular faces of each permanent magnet plate 18 lies aganst a radial face of an adjacent iron block 20. The permanent magnet plates 18 are magnetized with north (N) and south (S) magnetic poles on their opposing large area rectangular faces so that their N-S magnetic axes extend through their relatively small thicknesses. The six permanent magnet plates 18 are arranged so that the radial side of each magnetically soft iron block 20 is contacted with a permanent magnet surface of the same polarity, N or S. Thus, the N or S designations on the upper side of each iron block 20 refers to the like polarity of the adjacent faces of the permanent magnet plates 18 lying against its radial faces.

Magnet chuck layers 12 and 14 may be oriented by rotation of one of the layers about the common central axis so that soft iron blocks (designated N or S) may be aligned N opposite N or N opposite S with respect to the opposing layer. When a magnetically soft iron block designated N of one chuck layer 12 lies opposite a block designated S of the other layer 14 the magnetic flux loop lies within the chuck layers 12, 14 and the chuck 10 is in its inactive state. However, as viewed in FIG. 1, the magnet chuck layers 12 and 14 are aligned so that iron blocks 20 designated N in the top layer 12 overlie an iron block of like designation N in the lower layer 14 and the chuck 10 is then magnetically activated. As seen in the lower portion of FIG. 1 the magnetic flux (illustrated symbolically with six loops 26) extends above the upper surface of chuck layer 12 for attraction of a ferromagnetic workpiece, not shown.

FIG. 3 illustrates a plan view of magnetic chuck 10 showing the chuck layers confined in a hexagonal brass frame 22. At least one of the chuck layers 12 and 14 are rotatable within frame 22 to switch the chuck 10 between magnetically inactive and magnetically active positions. In this illustration, the visible surface of upper chuck layer 12 in FIG. 3 is the working face 24 of the chuck 10 for holding a workpiece. Working face 24 includes the upper surfaces of brass center rod 16, six rectangular permanent magnet plates 18, and six pie-shaped magnetically soft iron blocks 20. But center rod 16 is non-magnetic. And, in this example, the polarity of permanent magnet plates 18 is oriented parallel to the working surface 24 so that the magnetic flux contribution of plates 18 to the working surface 24 is largely through the visible surfaces of iron blocks 20. The three pairs of directional arrows seen in FIG. 3 indicate the orientations of the magnetically north faces of permanent magnets 18 which result in alternate iron blocks 20 being designated as N. Of course, the opposite sides of the permanent magnets 18 are magnetically south faces, and the intevening pie-shaped iron blocks are designated as S.

As an extension of the chuck design concept illustrated in FIG. 1, a similar arrangement for a set of four (4) magnets (sometimes called Quad arrangement) is presented in the parent application. The working principle for the Quad arrangement is basically the same as is illustrated in FIGS. 1 and 3, but the angle of rotation to activate (or deactivate) a Quad chuck is then 90°. The concept can be extended to sets of 8 (Octa), 10 (Deca), 12 (Dodeca), etc. . . . magnets arrangements for very much larger and stronger chucks. The chuck with two sets of 4 magnets can be designed to form a square base while the chucks with two sets of 8, 10, or 12 magnets can be designed to form the respective polygonal base or a round base. However, when such a chuck design is contemplated, it is usually necssary to predict or estimate the attractive force that the chuck can exert given the properties of the permanent magnet materials selected and the soft magnet materials selected. The procedure is summarized as follows with illustrative reference to the hexagonal (Hexa) permanent magnet chuck 10 illustrated in FIGS. 1, 2, and 3.

Procedure for Establishing Design Parameters of a Magnetic Chuck

Specifics of the following procedure are directed to chuck designs of the parent application.

1. Assume a radius for the center brass cylinder and a thickness of the permanent magnets.
2. Using the following mathematical expression and for a matrix of permanent magnet plate (PM) lengths and heights, compute the different quantities: total soft iron chuck surface area, Fe/PM cross-section areas ratio, force intensity, and total force for quadragonal, hexagonal, or octagonal chuck arrangements.

$$F = \frac{a + bx}{1 + cx + dx^2}$$

where F is force per unit area, x is the ratio of cross sections of iron and permanent magnets, a=4.57, b=−1.45, c=4.37, and d=−0.19. These values are determined by a regression analysis of the data obtained by inspection and analysis of several Nd—Fe—B permanent magnet/magnetically soft iron magnetic chucks and summarized in FIG. 5.

3. Determine the range of the PM dimensions (height H & length L) which would bracket the level of magnetic force to be produced. If need be, finer subdivisions of the H or L parameters can be assumed and their corresponding forces computed.

4. When a set of H&L dimensions has been established, then a 3D CAD drawing including details of the various chuck design features such as outside housing, cover plate, bolt holes, lock pins, etc. can be modeled on a magnetostatics finite element software to calculate at an even higher accuracy the expected magnetic holding force.

In order to determine the attractive force of magnetic chuck 10 in accordance with this invention, it is necessary as one step to determine the effective cross-sectional area of permanent magnet plates 18 through which magnetic flux is being introduced to each working surface of magnetically soft iron blocks 20. This determination is illustrated by referance to FIG. 2. FIG. 2 shows two pie-shaped magnetically soft iron blocks 20' and 20" broken out from the view of chuck 10 in FIG. 1. So this illustrative analysis represents about one-sixth of the effective working surface of chuck 10.

Top surface 30 of upper iron block 20' is the surface through which magnetic flux (represented schematically by dashed lines 38) pass into a workpiece, not shown. The north magnetic poles of two permanent magnet plates 18 lie against radial side surfaces 32 of pie shaped upper iron block 20' and two more permanent magnet plates 18 (N sides) lie against identical side surfaces 34 of lower iron block 20". Thus, in the chuck embodiment of FIG. 2, magnetic flux (lines 38, drawn from only two permanent magnet plates to simplify the illustration in FIG. 2) from the N-pole sides of four permanent magnet plates 18 enters through their contacting sides 36 into the radial sides 32, 34 of two soft iron blocks 20', 20". But all of this magnetic flux passes through the upper surface 30 of upper soft iron block 20'. The total flux transmitting area for the working surface (24 in FIG. 3) of chuck 10 is the sum of the areas of six identical soft iron block 20' upper surfaces 30. Thus, in this example, the value of x (which is a ratio obtainable by analysis of any of the six identical PM-soft iron combinations) is the area of the pie shaped surface 30 of block 20' divided by four times the area of a face 36 of a permanent magnet 18. The value of x is then used to determine the attractive force of a region of working surface 24 or the total surface.

Sample calculations for hexagonal chuck constructions as illustrated in FIGS. 1–3 and their quad and octagonal variations are illustrated in the following computational table. In these calculations the radius of the brass center rod was 0.5000 inch, the thickness of each PM plate was 0.2500 inch, and the values of the regression coefficients were; a=4.5666, b=−1.4533, c=4.3664, and d=−0.1939. The values of the height (h) and length (L) of the PM were varied. In these embodiments, the length and height of the PM are also the facing dimensions of the soft iron body. The working areas of the soft iron bodies were determined from their shape and did not include the area of the brass center rod or of the upper surfaces of the PM plates.

| Chuck Design | PM height (h), inch | PM length (L), inch | Total Fe Area, sq. inch | Fe/PM Ratio | F intensity, N/sq. mm. | Total Force, N |
|---|---|---|---|---|---|---|
| Quad | 0.8 | 1 | 5.28 | 0.41 | 1.43 | 4,883 |
|  | 0.8 | 2 | 16.85 | 0.66 | 0.95 | 10,355 |
|  | 0.8 | 3 | 34.70 | 0.90 | 0.68 | 15,214 |
|  | 0.8 | 4 | 58.83 | 1.15 | 0.50 | 19,084 |
|  | 0.7 | 1 | 5.28 | 0.47 | 1.29 | 4,385 |

-continued

| Chuck Design | PM height (h), inch | PM length (L), inch | Total Fe Area, sq. inch | Fe/PM Ratio | F intensity, N/sq. mm. | Total Force, N |
|---|---|---|---|---|---|---|
| | 0.7 | 2 | 16.85 | 0.75 | 0.83 | 9,045 |
| | 0.7 | 3 | 34.70 | 1.03 | 0.58 | 12,944 |
| | 0.7 | 4 | 58.83 | 1.31 | 0.42 | 15,766 |
| Hexa | 0.8 | 1 | 4.78 | 0.25 | 2.03 | 6,251 |
| | 0.8 | 2 | 15.85 | 0.41 | 1.43 | 14,648 |
| | 0.8 | 3 | 33.20 | 0.58 | 1.08 | 23,136 |
| | 0.8 | 4 | 56.83 | 0.74 | 0.85 | 31,032 |
| | 0.7 | 1 | 4.78 | 0.28 | 1.86 | 5,753 |
| | 0.7 | 2 | 15.85 | 0.47 | 1.29 | 13,156 |
| | 0.7 | 3 | 33.20 | 0.66 | 0.95 | 20,387 |
| | 0.7 | 4 | 56.83 | 0.85 | 0.73 | 26,872 |
| Octa | 0.8 | 1 | 4.28 | 0.17 | 2.51 | 6,925 |
| | 0.8 | 2 | 14.85 | 0.29 | 1.84 | 17,649 |
| | 0.8 | 3 | 31.70 | 0.41 | 1.43 | 29,295 |
| | 0.8 | 4 | 54.83 | 0.54 | 1.15 | 40,828 |
| | 0.7 | 1 | 4.28 | 0.19 | 2.35 | 6,484 |
| | 0.7 | 2 | 14.85 | 0.33 | 1.68 | 16,131 |
| | 0.7 | 3 | 31.70 | 0.47 | 1.29 | 26,312 |
| | 0.7 | 4 | 54.83 | 0.61 | 1.02 | 36,140 |

It is seen that the total force in newtons increases with the size and number of permanent magnets. These calculations based on the ratio of iron surface area to PM surface area, when correctly determined, provides a realtively easy and accurate way of estimating the attractive force of a permanent magnet based chuck.

Figure 4:
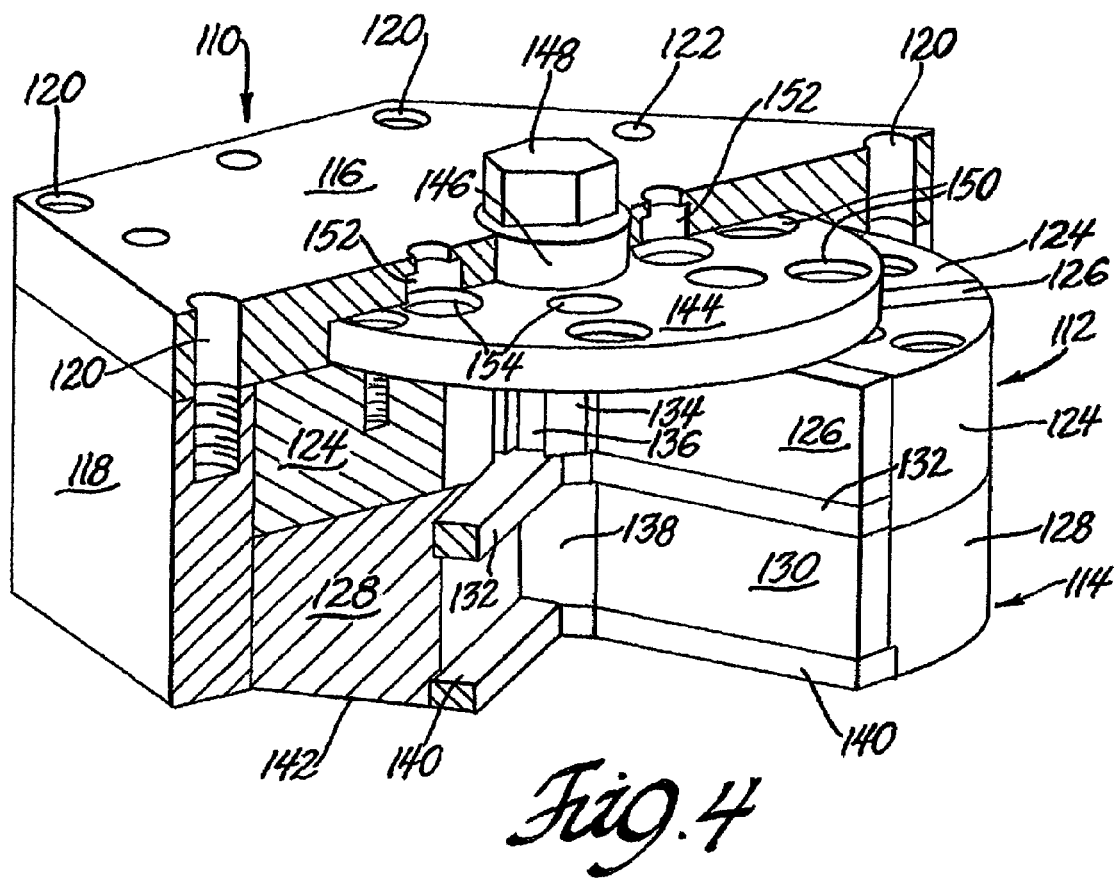
FIG. 4 is an oblique view, partly broken away and in cross-section, of an assembled six soft magnet block per chuck layer, two layer permanent magnet chuck.

While this estimation process enables the design of the magnetic components of the chuck, an illustration of a more complete chuck is provided in FIG. 4.

FIG. 4 illustrates an assembled, two-layer, permanent magnet chuck 110 of the six permanent magnet plate, six pie-shaped soft magnet block, circular (disk) chuck layer embodiment as described with respect to FIGS. 1–3. FIG. 4 is a sectional view. The assembled permanent magnet chuck 110 has two circular chuck layers, upper chuck layer 112 and lower chuck layer 114. Chuck layers 112 and 114 are supported in a brass (non-magnetic) chuck frame that includes a hexagonal top 116 and a side wall 118 that has a hexagonal periphery with a round internal surface to receive round chuck layers 112 and 114. Top 116 is suitably bolted to side wall 118 through bolt holes 120. Top 116 may also have bolt holes 122 for eye-bolts for lifting of magnet chuck 110.

Upper chuck layer 112 is adapted to be rotated, as will be described, between magnetically activated and magnetically in-activated positions of chuck 110. Lower chuck layer 114 is fixed stationary within side wall 118 of the frame of chuck 110. Upper chuck layer 112 has six pie-shaped soft magnet (iron or low alloy steel) blocks 124 and six interposed permanent magnet plates 126, although only a few of the plates and blocks are visible in the FIG. 4 sectional view. Permanent magnet plates 126 are suitably formed of an iron-neodymium-boron composition and magnetized through the thickness of the plate as described above, to induce alternating magnetic polarities in the six soft magnet blocks 124. Each pair of one soft magnet block 124 and adjacent permanent magnet plate nominally spans about 60° of the circumference of chuck layer 112.

Lower chuck layer 114 also has six pie-shaped soft magnet blocks 128 and six interposed permanent magnet plates 130. Except for modifications for mechanical attachment in their respective chuck layers 112, 114, the soft magnet blocks 124, 128 in the two layers are of matching shape and composition. And the permanent magnet plates 126, 130 are likewise matching in shape and performance.

Upper chuck layer 112 also includes non-magnetic bars or ribs 132 fixed at one end to a non-magnetic, rotatable vertical hub 136. These non-magnetic components are suitably made of brass. Six nonmagnetic bars 132 extend radially in chuck layer 112 from hub 134 to the circumference of the chuck layer 112 and underlie a permanent magnet plate 126, separating that plate 126 from a matching permanent magnet plate 130 in the lower chuck layer 114. Hub 134 contains six vertical slots 136 to receive inward ends of permanent magnet plates 126. In addition to supporting permanent magnet plates 126, non-magnetic bars 132 prevent magnetic flux from magnet plates 126 from directly combining with magnetic flux from permanent magnet plates 130. It is preferred that the flux from the respective permanent magnet plates 126, 130 be directed into the flux enhancing soft magnet blocks 124, 128.

Lower chuck layer 114 also has a central non-magnetic hub 138, but hub 138 is not adapted for rotation in this example. Fixed to hub 138 and extending radially outwardly at 60° angles are six non-magnetic bars or ribs 140. Each of bars 140 lies under a permanent magnet block 130. Bars 140 are secured at their outer ends to frame side wall 118 and prevent rotation of soft magnet bodies 128.

As viewed in FIG. 4, the lower surface 142 of chuck 110 is the non-rotating working face of the chuck against which workpieces are to be held. Surface 142 is enclosed within frame sidewall 118 and includes the bottom surfaces of non-magnetic bars 140 and the bottom surfaces of the six pie-shaped soft magnet blocks 128 through which the magnetic flux of the chuck is directed.

Upper chuck layer 112 is adapted to be rotated with respect to lower chuck layer 114 to activate chuck 110. The relative rotation of round six member permanent magnet plate-soft magnet block chuck layers is as described with respect to FIGS. 1 and 3. Hub 134 of upper chuck layer 112 is connected to a round chuck layer rotor 144. Rotor 144 is received in a suitable cavity formed in the inner surface of chuck frame top 116. Rotor journal 146 is positioned in a center hole in frame top 116. Fixed to the top of journal 146 is a hexagonal lug nut head 148 for gripping with a wrench or other tool or means for rotating chuck layer 112 through an angle of 60° with respect to lower chuck layer 114. Bolt holes 150 are provided at the periphery of rotor 144 for attachment to soft magnet blocks 124 in chuck layer 112. Index holes 152 in frame top 116 may be used with springs and studs (not shown) in holes 154 in rotor 144 for controlling precise positioning of chuck layer 112. Thus, chuck layer 112 with its central hub 134 and attached rotor 144, rotor journal 146 and lug nut 148 are movable elements of chuck 110. As stated, the effect of the relative rotation of the chuck layers is as described with respect to FIG. 3.

By way of illustration and not limitation of the invention, the physical characteristics a chuck like that illustrated in FIG. 4 are described. The dimension across opposing hexagonal sides of the frame was 5.8 inches and the height from working surface to frame top was 2.6 inches. Each chuck layer had six rectangular commercial Fe—Nd—B permanent magnets 2.25 inches long, 0.8 inch high, and 0.2 inch thick. The magnets were magnetized with the N pole on one major rectangular surface and the S pole on the opposite rectangular surface. The outer diameter of each pair of opposing pie-shaped, soft magnet steel blocks was 5.3 inches. When the chuck layers were in their magnetically active positions the holding force of the chuck for a ferromagnetic workpiece was 3,200 pounds force (14.2 kN).

Variations of chuck 110 have been made without the non-ferrous bars 132 between the two magnetic layers 112 and 114. This change simplifies the fabrication of soft magnet blocks 124 and does not affect the magnetic performance of the chuck 110. In a further modification of chuck 110, a thin round steel disc (5.3" diameter x 0.010" thick) was inserted between magnetic layers 112 and 114. The disc did not affect the magnetic performance of the chuck, but the disc did serve as a separator between layers 112, 114 and facilitated their rotation.

While the practice of the invention has been described with respect to specific magnetic chuck structures the method of determining the attractive force of a chuck in not limited to the specific examples.

The invention claimed is:

1. A method of estimating magnetic attractive force obtainable in a design for a magnetic chuck where the design comprises at least one magnetically soft body and at least one permanent magnet body arranged to provide, during operation of the chuck, a closed path of magnetic flux extending through the at least one permanent magnet body, the at least one magnetically soft body, and a working surface of the magnet chuck, the magnetically soft body having a first surface to constitute at least a portion of the working face of the magnet chuck, the magnetically soft body having a second surface in face-to-face contact with a surface of the at least one permanent magnet body, the path of magnetic flux to pass from the at least one permanent magnet body through the magnetically soft body and through the first surface of the magnetically soft body; the method comprising:

determining the design area of the first surface of the magnetically soft body;

determining the total area of the designed surfaces of the at least one permanent magnet body in face to face contact with the magnetically soft body;

obtaining an area-to-area ratio of (a) design area of the first surface of the magnetically soft body and (b) the total area of the designed surfaces of the at least one permanent magnet body; and comparing the obtained area-to-area ratio with like data of at least one area-to-area ratio obtained from at least one working magnet chuck of known magnetic attractive forces.

2. A method of estimating magnetic attractive force obtainable in a design for a magnetic chuck as recited in claim 1 where area-to-area ratio data from a plurality of working magnet chucks is formulated in a graphical curve of attractive force per unit area of working surface of the magnet chuck versus the area-to-area ratio.

3. A method of estimating magnetic attractive force obtainable in a design for a magnetic chuck as recited in claim 2 where the data of the graphical curve has been converted to an algebraic expression relating attractive force per unit area of working surface of the magnet chuck versus the area-to-area ratio.

4. A method of estimating magnetic attractive force obtainable in a design for a magnetic chuck as recited in claim 1 further comprising:

making a first design for a magnetic chuck of specified magnetic attractive force for the working surface of the magnetic chuck by making first design estimates of dimensions of the at least one permanent magnet body and of the at least one magnetically soft body, the design estimates determining the area-to area ratio;

estimating the magnetic force of the first design by the steps of claim 1; and, if necessary using the estimated force for making a second design for the magnetic chuck of specified magnetic force.

5. A method of estimating magnetic attractive force obtainable in a design for a magnetic chuck as recited in claim 1 when each permanent magnet body is formed of iron-neodymium-boron permanent magnet material and each magnetically soft body is formed of ferrous material.

6. A method of estimating magnetic attractive force obtainable in a design for a magnetic chuck as recited in claim 1 when the design comprises;

a first chuck layer and a second chuck layer, each of the chuck layers having a common center of rotation, a common periphery, and flat parallel upper and lower surfaces;

the first chuck layer comprising an even number of permanent magnet plates, each permanent magnet plate having an inner end at the center of rotation of the first chuck layer and extending radially outwardly to the periphery, each permanent magnet plate having opposed plate surfaces perpendicular to the upper and lower surfaces of the chuck layer, the plate being magnetized with its north magnetic pole (N) and its south magnetic pole (S) at its opposing plate surfaces;

the first chuck layer further comprising a block of magnetically soft material interposed between each pair of magnetized permanent magnet plates around the center of rotation, with the magnetic poles of the plates being oriented so that the magnetically soft blocks are magnetized with alternating N and S polarities around the center of rotation;

the second chuck layer comprising permanent magnet plates and soft magnet blocks that are complementary in shape and position to the permanent magnet plates and soft magnet blocks of the first layer, the first and second chuck layers being assembled in the chuck so that magnetized soft magnet blocks of one chuck layer can overlie magnetized soft magnet blocks of the other chuck layer.

\* \* \* \* \*